United States Patent [19]

Taga et al.

[11] Patent Number: 5,162,936
[45] Date of Patent: Nov. 10, 1992

[54] APPARATUS FOR MONITORING THE OPERATION OF AN OPTICAL REPEATER

[75] Inventors: Hidenori Taga, Tokyo; Shu Yamamoto, Shiki; Noboru Edagawa, Hirakata; Hiroharu Wakabayashi, Kawasaki, all of Japan

[73] Assignee: Kokusai Denshin Denwa Company, Ltd., Tokyo, Japan

[21] Appl. No.: 655,530

[22] Filed: Feb. 14, 1991

[30] Foreign Application Priority Data

Mar. 1, 1990 [JP] Japan .................................. 2-47312

[51] Int. Cl.$^5$ ............................................. H04B 10/02
[52] U.S. Cl. .................................. 359/177; 370/13.1; 375/3; 340/425
[58] Field of Search ........................... 389/174, 175–177, 389/179; 370/13.1; 375/3; 340/425

[56] References Cited

U.S. PATENT DOCUMENTS

| 4,843,382 | 6/1989 | Oda et al. | 359/177 |
| 4,971,417 | 11/1990 | Krinsky et al. | 359/174 |

FOREIGN PATENT DOCUMENTS 0020129  1/1990  Japan .................................. 359/177

Primary Examiner—Edward L. Coles, Sr.
Assistant Examiner—Kinfe-Michael Negash
Attorney, Agent, or Firm—Jordan and Hamburg

[57] ABSTRACT

Apparatus for monitoring a plurality of optical repeaters of an optical communication system in which each said repeater directly amplifies an optical signal transmitted in an optical fiber and passing through the respective optical repeater, including an optical division circuit for dividing an outgoing main line signal and a monitoring signal, a format conversion circuit by which monitoring information is converted into binary information, a previous modulation circuit by which a monitoring signal is modulated with a sine wave, a comparison circuit which compares the monitoring signal with a reference voltage, a voltage controlled amplifier which amplifies the modulated monitoring signal, an automatic gain control circuit which regulates the output from the outgoing optical repeater, and an outgoing optical repeater which includes a stimulating light source, a wave synthesizer and a doped optical fiber.

6 Claims, 3 Drawing Sheets

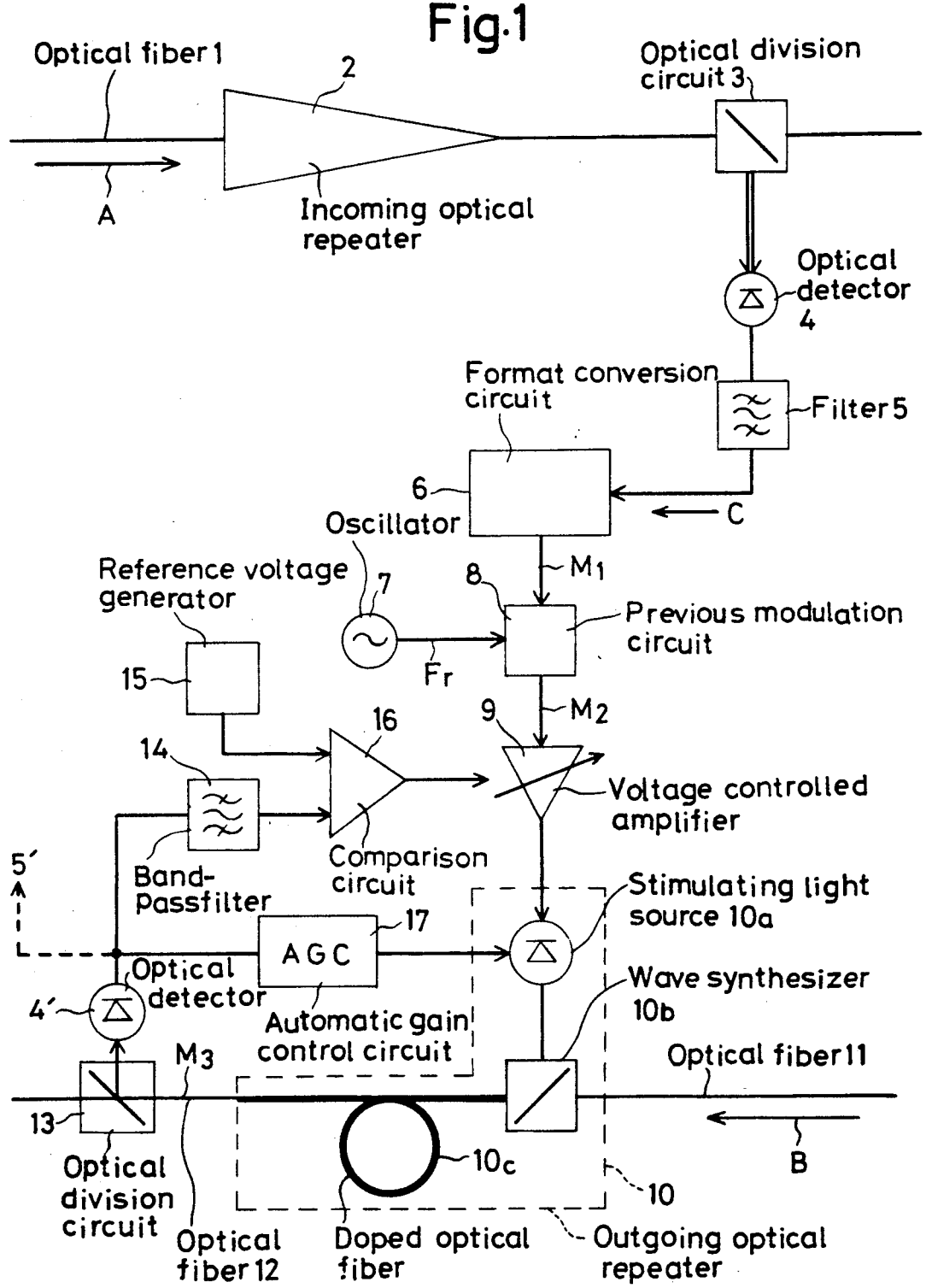

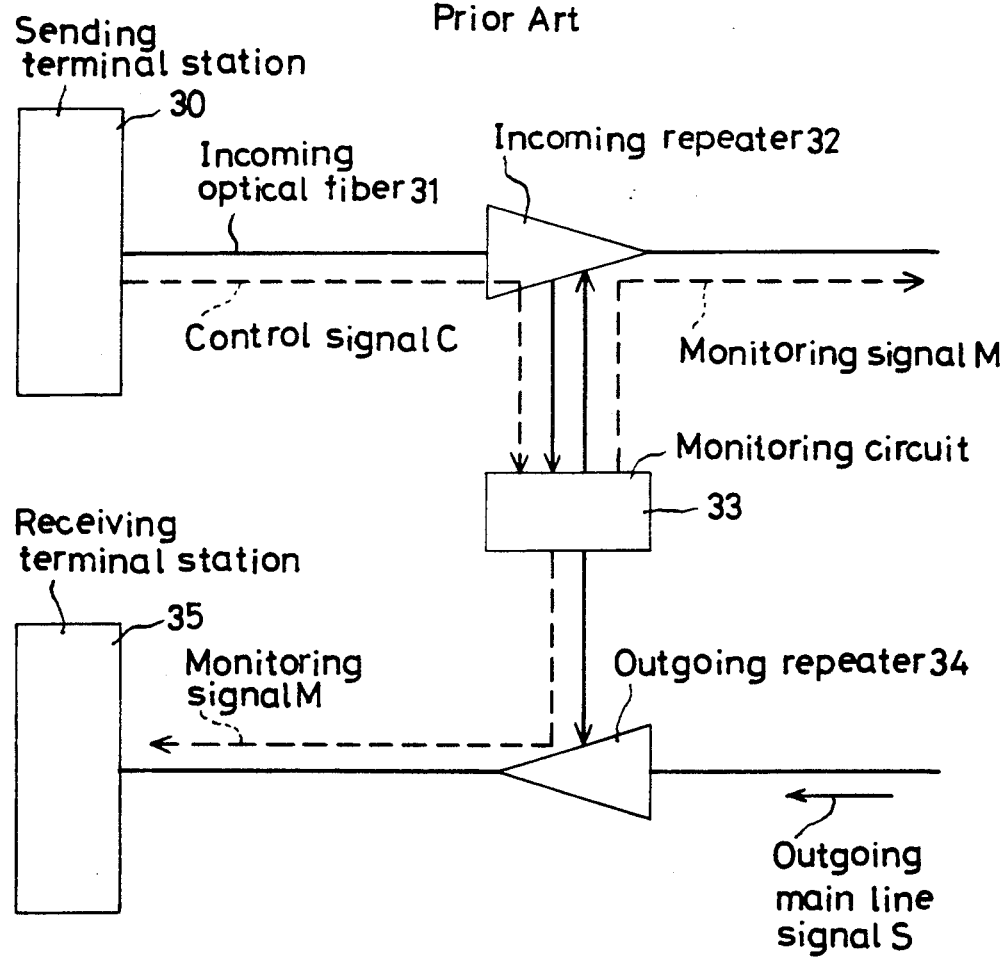

APPARATUS FOR MONITORING THE OPERATION OF AN OPTICAL REPEATER

BACKGROUND OF THE INVENTION

The present invention relates to apparatus for monitoring the operation of the optical repeater of an optical communication system employing the repeater, such that the optical signal transmitted in an optical fiber can be directly amplified when the signal is in the form of light.

The function of monitoring from a terminal station, the operation of optical repeaters made of semiconductor laser amplifiers or optical fiber amplifiers, while continuing the service of an optical communication system, so that an optical signal transmitted in an optical fiber is directly amplified by each repeater at a plurality of stages when the signal is in the form of light, is very important for the stable operation of the system.

FIG. 3 is a block diagram for describing a conventional method of monitoring the operation of an optical repeater. As shown in FIG. 3, the predetermined incoming optical repeater 32 to be monitored is controlled by a prescribed control signal C through an incoming optical fiber 31 from a sending terminal station 30. For the incoming optical repeater 32 appointed by the control signal C, appointed monitoring information is created in a prescribed format by a monitoring circuit 33. An outgoing main line signal S is subjected to prescribed modulation by a created monitoring signal M through an outgoing optical repeater 34 in an outgoing line and then sent to a receiving terminal station 35. For control and modulation of the signals, a method in which an incoming main line signal and the outgoing main line signal are subjected to a low degree of amplitude modulation at a frequency sufficiently lower than the speed of the signals was already proposed by the present applicant in Japanese Patent Application No. 63-270729 entitled "Monitoring and controlling method for optical repeater". When the outgoing main line signal S in subjected to amplitude modulation, the degree of the modulation needs to be kept sufficiently constant so as not to affect the transmission characteristics of the signal. The monitoring information is usually converted into a binary signal which has previously been subjected to modulation so as to become a low-frequency signal by which the outgoing main line signal S is modulated. The signal S is thus subjected to substantially constant amplitude modulation so that the monitoring signal is superposed on the outgoing main line signal which is sent to the receiving terminal station 35. Although conventional amplitude modulation is performed by directly increasing and decreasing the gain of the optical repeater which is comprised of an optical amplifier, the amplification characteristics of the repeater are greatly affected by environmental conditions such as temperature so that it is difficult to keep the degree of modulation constant. For that reason, the degree of modulation of the main line signal is not constant. As a result, the transmission characteristics of the main line signal will be affected.

SUMMARY OF THE INVENTION

The present invention provides a monitoring apparatus for an optical repeater that solves the above-mentioned problems.

Accordingly, it is an object of the present invention to provide apparatus in which a main line signal is modulated without affecting the transmission characteristics thereof.

The method provides for monitoring of the optical repeaters of an optical communication system in which the repeaters, in each of which an optical signal transmitted in an optical fiber is directly amplified when the signal is in the form of light, are provided at a large number of stages. The apparatus includes a conversion means by which monitoring information is converted into binary information; a previous modulation means by which a monitoring signal which contains the binary information is subjected to previous modulation with a prescribed sine wave; a modulation means by which the optical signal passing through the repeater is subjected to amplitude modulation with a portion of the monitoring signal subjected to the previous modulation; a filter means by which a component corresponding to the optical signal subjected to the amplitude modulation is extracted through tuning of the sine wave for the previous modulation; and an amplitude control means by which the amplitude of the monitoring signal subjected to the previous modulation is controlled so that the amplitude of the extracted component is nearly equal to a prescribed reference value. This results in solving of the above-mentioned problems.

With the above-mentioned apparatus, the degree of the amplitude modulation of the main line signal does not depend on the optical repeater whose amplification characteristics are much affected by environmental conditions such as temperature. This differs from a conventional amplitude modulation apparatus in which the gain of an optical repeater is directly increased and decreased. The main line signal passing through the repeater is subjected to the amplitude modulation with the monitoring signal subjected to the amplitude control after the previous modulation. The degree of the amplitude modulation of the main line signal is kept constant so that an amplitude value obtained by extracting a portion of the modulated main line signal through the filter means tuned to a frequency for the previous modulation is equal to the prescribed reference value, thus preventing the transmission characteristics of the main line signal from being adversely affected.

DESCRIPTION OF THE DRAWINGS

FIG. 1 is a block diagram of an optical repeater monitoring apparatus according to an embodiment of the present invention;

FIG. 3 is a block diagram use to illustrate a conventional optical repeater monitoring method.

DETAILED DESCRIPTION OF AN EXEMPLARY EMBODIMENT

Figure 2A:
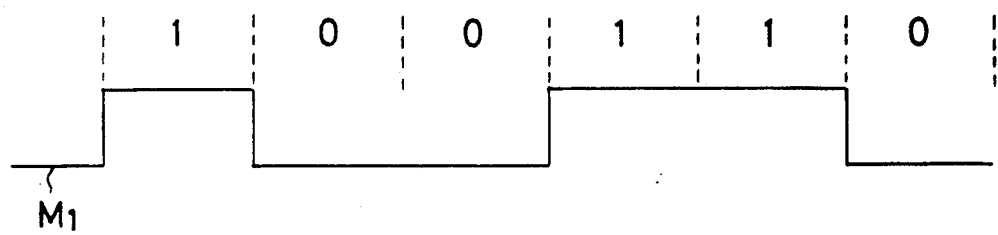
FIGS. 2(a), 2(b) and 2(c) show the waveforms of monitoring signals with the apparatus of FIG. 1.

FIG. 1 is a block diagram of an optical repeater monitoring apparatus according to an embodiment of the present invention. FIG. 1 shows an optical fiber 1 for transmitting an optical signal, an incoming optical repeater 2, an optical division circuit 3 for dividing an incoming main line signal A, optical detectors 4 and 4' which are light receivers and which convert optical signals into electric signals, and filters 5 and 5' for extracting control signals C which are control instruction signals. A format conversion circuit 6 decodes the control signal C and converts monitoring information to a prescribed format of a monitoring signal M1. An oscillator 7 generates a low-frequency signal for performing the previous modulation of the monitoring signal M1, and a previous modulation circuit 8 modulates the monitoring signal M1 with low-frequency signal. A voltage-controlled amplifier 9 whose gain is changed under external control amplifies the modulated signal M2. The signal is then supplied to an outgoing optical repeater 10 comprised of an optical fiber amplifier and including a stimulating light source 10a, a wave synthesizer 10b and a doped optical fiber 10c. Optical fibers 11 and 12 are connected as outgoing transmission media to the input and output ends of the doped optical fiber 10c. Further, an optical division circuit 13 is provided for dividing a signal into an outgoing line and a monitoring line. A band-pass filter 14 for extracting the low-frequency signal component of a monitoring signal and an automatic gain control (AGC) circuit 17 are connected to the output of optical division circuit 13 through optical detector 4'. AGC circuit 17 regulates the output from the outgoing optical repeater 10 to a constant level. A reference voltage generator 15 generates a reference voltage, and a comparison circuit 16 compares the monitoring signal from band-pass filter 14 with the reference voltage in order to control voltage-controlled amplifier 9. Stimulating light source 10a is a pumping light source made of a semiconductor laser unit and generates stimulating light which functions as pumping light for stimulating the doped optical fiber 10c. Wave synthesizer 10b synthesizes the stimulating light with an outgoing main line signal B. The doped optical fiber 10c is manufactured by doping a quartz fiber with a rare earth element such as erbium. FIG. shows a means for monitoring optical repeater 2 provided in an incoming line, but does not show any means for monitoring optical repeater 10 provided in the outgoing line. However, such a monitoring means will be disposed at the position of filter 5' in the same manner as the monitoring means for the incoming line. FIG. 1 also shows an incoming main line signal A containing the control signal C, an outgoing main line signal B, and portions M1, M2 and M3 of monitoring information in optical repeater 2.

Figure 2B:
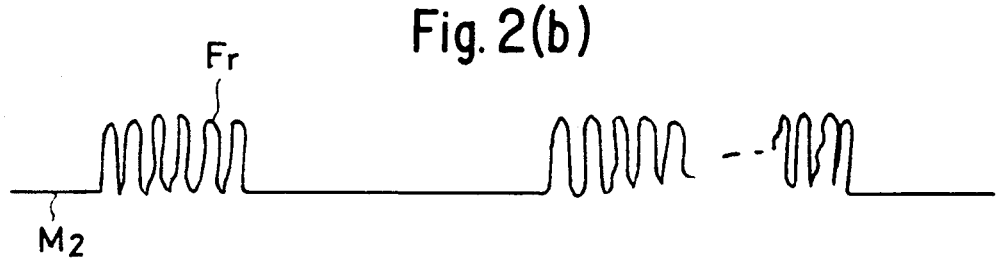
Figure 2C:
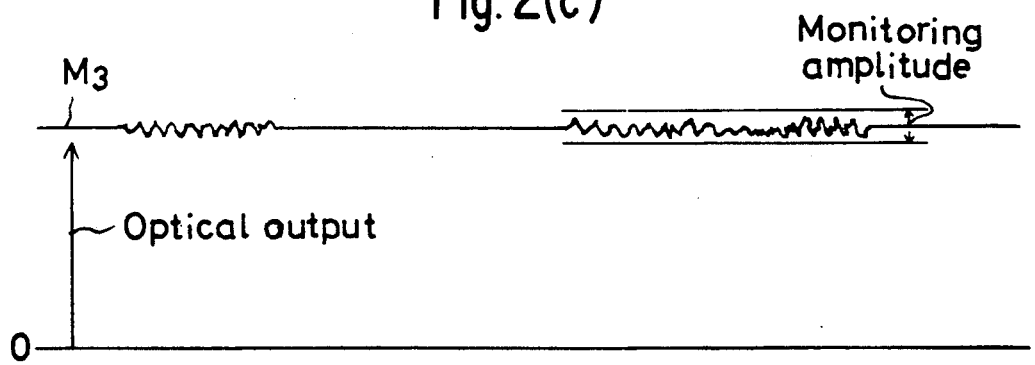

Shown at (a), (b) and (c) in FIG. 2 are the waveforms of the monitoring signals M1, M2 and M3 in optical repeater 2. Monitoring signal M1 is a binary signal generated by the conversion in format conversion circuit 6. Monitoring signal M2 is a signal subjected to the previous modulation with the low-frequency signal generated by oscillator 7 and having a frequency Fr. Monitoring signal M3 is an optical signal generated at the output side of outgoing repeater 10 through the synthesis and amplification of outgoing main line signal B and monitoring signal M2. Although the level of optical signal M3 is kept constant by automatic gain control circuit 17 shown in FIG. 1, there is a minute amplitude fluctuation of the optical signal at the place of the superposition of monitoring signal M3 on outgoing main line signal B, as shown in FIG. 2(c). Optical signal M3 is then sent to a receiving terminal station not shown in the drawings.

Stimulating light source 10a is driven by both the output from previous modulation circuit 8 and a laser driving direct current supplied from automatic gain control circuit 17 via voltage-controlled amplifier 9. Since the output from doped optical fiber 10c is proportional to electric power for stimulating light source 10a, optical signal M3 as the output from outgoing optical repeater 10 has the waveform shown in FIG. 2(c). Optical signal M3 is converted into an electric signal by light receiver 4. Only a frequency (Fr) component is extracted from the electric signal by filter 14 tuned to the oscillation frequency Fr of oscillator 7, and is then compared with the reference voltage generated by reference voltage generator 15. The difference between the frequency component and the reference voltage is fed back to voltage-controlled amplifier 9 so that the amplitude of the frequency component is controlled to be constant. Because of this control, a monitoring amplitude shown at M3 in FIG. 2, which is equal to the degree of the modulation with regard to the ratio of the amplitude to that of the optical output from repeater 10, is always kept constant. This makes it possible to send the stable outgoing main line signal B and the monitoring optical signal M3 superposed thereon toward the receiving terminal station.

In the method, the oscillation frequency Fr of oscillator 7 and the frequency of filter 14 need to be stably tuned to each other for a long time. For that purpose, it is effective to make oscillator 7 a crystal oscillator and/or filter 14 a crystal filter.

Although oscillator 7 is disposed in the optical repeater in the embodiment so as to feed the low-frequency signal, the oscillator may be disposed in a terminal station so as to feed the low-frequency signal together with the control instruction signal from the station to produce the same effect as the above-described embodiment. Further, although the optical fiber amplifier employing the doped optical fiber is provided as an optical amplifier in the embodiment, a different optical amplifier may be provided instead. If a semiconductor laser amplifier is provided as the optical amplifier in the embodiment, the monitoring signal M2 shown in FIG. 2 may be superposed on an injected current for the semiconductor laser amplifier.

As described above, the low-frequency signal component contained in the modulation signal superposed on the main line signal is extracted by the filter tuned to the component. The amplitude of the modulation signal injected into the stimulating light source is controlled so that the level of the component is constant. For that reason, the main line signal can be modulated without affecting the transmission characteristics thereof.

Oscillator 7, which generates a sine-wave signal for the previous modulation may be made of a crystal oscillator in order to stably tune the frequency of the oscillator and that of filter 14 to each other for a long time. Filter 14 may be made of a crystal filter to stably tune the frequency of oscillator 7 and that of the filter to each other for a long time.

The monitoring information on the optical repeater can thus be stably transmitted while a optical communication system employing the repeater is in service. For that reason, the optical repeater monitoring method can be used for a long-distance optical communication system, whether the system is in service or out of service. This produces a highly desirable effect.

What is claimed is:
1. Apparatus for monitoring a plurality of optical repeaters of an optical communication system in which each said repeater directly amplifies an optical signal transmitted in an optical fiber and passing through the respective optical repeater, said apparatus comprising:
conversion means for converting monitoring information into binary information to form a monitoring signal;
previous modulation means for modulating said monitoring signal with a prescribed sine wave;

modulation means for amplitude modulating said optical signal passing through said register with a portion of said modulated monitoring signal to produce an output signal;

filter means for extracting a component corresponding to said amplitude modulated optical signal by tuning to said sine wave of said previous modulation means; and amplitude control means for controlling the amplitude of said modulated monitoring signal so that the amplitude of said extracted component is nearly equal to a prescribed reference value.

2. Apparatus according to claim 1, further including crystal oscillator means for producing the sine wave used by the previous modulation means.

3. Apparatus according to claim 1, wherein the filter means is a crystal filter.

4. Apparatus according to claim 1, wherein said amplitude control means includes reference voltage generator means for generating a reference voltage signal, comparator means for comparing the reference voltage signal with said extracted component and for producing a control signal in response thereto, and voltage controlled amplifier means for controlling the amplitude of said modulated monitoring signal in response to said control signal.

5. Apparatus according to claim 1, wherein said amplitude modulation means includes a wave synthesizer.

6. Apparatus according to claim 1, further including optical division means for dividing said output signal into an outgoing main line signal and said modulated monitoring signal, and for supplying said modulated monitoring signal to said filter means.

* * * * *